(12) United States Patent
Xue et al.

(10) Patent No.: US 9,230,030 B2
(45) Date of Patent: Jan. 5, 2016

(54) METHOD AND SYSTEM FOR MINING WEBSITES

(75) Inventors: Feng Xue, Clifton Park, NY (US); Abha Moitra, Scotia, NY (US); Steven Matt Gustafson, Niskayuna, NY (US)

(73) Assignee: NBCUNIVERSAL MEDIA, LLC, Wilmington, DE (US)

( * ) Notice: Subject to any disclaimer, the term of this patent is extended or adjusted under 35 U.S.C. 154(b) by 955 days.

(21) Appl. No.: 12/340,935

(22) Filed: Dec. 22, 2008

(65) Prior Publication Data

US 2010/0161785 A1    Jun. 24, 2010

(51) Int. Cl.
*G06F 15/177* (2006.01)
*G06F 17/30* (2006.01)
*H04L 29/08* (2006.01)

(52) U.S. Cl.
CPC ........... *G06F 17/30867* (2013.01); *H04L 67/22* (2013.01)

(58) Field of Classification Search
CPC ... H04L 67/22; H04L 29/08675; H04L 43/08; H04L 29/08576; G06F 11/3438; G06F 17/30539; G06F 17/30867
USPC .................. 709/224, 227, 228; 707/776, 769; 706/12, 45
See application file for complete search history.

(56) References Cited

U.S. PATENT DOCUMENTS

| | | | | |
|---|---|---|---|---|
| 5,960,411 A * | 9/1999 | Hartman et al. | ............ | 705/26.81 |
| 6,606,657 B1 * | 8/2003 | Zilberstein et al. | ............ | 709/224 |
| 7,653,706 B2 * | 1/2010 | Day et al. | ............ | 709/219 |
| 8,219,583 B2 * | 7/2012 | Moitra | ............ | G06F 17/30861 707/711 |
| 8,521,773 B2 * | 8/2013 | Evans | ............ | G06F 17/30864 707/736 |
| 8,650,172 B2 * | 2/2014 | Song et al. | ............ | 707/706 |
| 2002/0069119 A1 * | 6/2002 | Rogatinsky | ............ | 705/26 |
| 2009/0281989 A1 * | 11/2009 | Shukla et al. | ............ | 707/3 |
| 2010/0125649 A1 * | 5/2010 | Day et al. | ............ | 709/219 |
| 2010/0153377 A1 * | 6/2010 | Rajan et al. | ............ | 707/723 |
| 2011/0213761 A1 * | 9/2011 | Song et al. | ............ | 707/706 |

* cited by examiner

*Primary Examiner* — Kenneth R Coulter
(74) *Attorney, Agent, or Firm* — Fletcher Yoder, P.C.

(57) ABSTRACT

One website mining embodiment is for characterizing first time users of a website, collecting user session data of the users visiting the website and identifying first time visitors, determining features of the first time visitors utilizing the user session data, determining rules utilizing the features of the first time visitors, monitoring actions of the first time visitors on the website, updating the rules utilizing the monitored actions of the first time visitors and recommending web content utilizing the rules to the first time visitor.

20 Claims, 6 Drawing Sheets

| 313 | 314 | 315 | 316 | 317 | ... | 318 | 319 | 320 | 321 | 322 | 323 | 324 | 325 | 326 |
|---|---|---|---|---|---|---|---|---|---|---|---|---|---|---|
| session_id | label | p1 | p2 | p3 | pn | f1 | f2 | f3 | ... | fm | u1 | u2 | u3 | up |
| 100001 | 1 | <beauty, navigation> | <beauty, content> | ... | ... | 3 | face | ... | ... | ... | USA | Window XP | ... | ... |
| 100002 | 0 | ... | ... | ... | ... | ... | ... | ... | ... | ... | ... | ... | ... | ... |
| ... | 1 | | | | | | | | | | | | | |

METHOD AND SYSTEM FOR MINING WEBSITES

BACKGROUND

Web usage mining refers to an application of data mining techniques to determine user access patterns from web usage data. Web usage mining typically involves tracking browsing activities using a variety of measures such as individual mouse clicks and time spent on a portion of a webpage in order to have a user's browsing footprint available at the web server. Generally, website mining results include features such as number of page views, number of unique users, browser and operating system information, user's website view pattern, widely viewed pages, browser and operating system information.

The ability to track the website usage information is useful to assess the impact of website content which can result in enhancement of business opportunities and metrics for cost benefits analysis. Tracking usage patterns is also useful for identifying which content on the website is being heavily used (and therefore should be kept) and which content is not being heavily used (and may be a candidate for archiving). In addition, it helps to improve the website design by rearranging the content on the pages so that the end users have a more convenient experience while exploring the website. In addition, website usage statistics can also keep track of how much storage space the web pages on a website are taking, which content on the website is important, and the level of activity for particular website pages or websites.

The enhancement of business opportunities, for example, include increasing the number of visits on the website. One way of increasing the number of visits is by increasing number of loyal users or by converting first time visitors to loyal users. The number of first time visitors can be increased by monitoring the web usage patterns and suggesting certain web content to first time visitors. Accordingly, it is desired to discover and act upon the various patterns of website usage to provide a more enjoyable experience to its first time visitors, which also help to increase the chances of converting these visitors into loyal users.

BRIEF DESCRIPTION

In accordance with one exemplary embodiment of the invention, a method for characterizing first time users of a website is disclosed. The method includes collecting user session data of users visiting the website and identifying first time visitors; determining features of the first time visitors utilizing the user session data; determining rules utilizing the features of the first time visitors; monitoring actions of the first time visitors on the website; recommending web content utilizing the rules to the first time visitor; and updating the rules utilizing the monitored actions of the first time visitors.

In accordance with another exemplary embodiment of the invention, a system for mining website is disclosed. The system includes a webserver for storing web usage data of a website in a storage device; and a webserver engine connected to the webserver. The webserver is for processing the user session data to determine features of first time visitors of the website and determining rules based on the features of the first time users; recommending web content to the first time visitors using the rules; monitoring actions of the first time visitor to update the rules; and updating the rules based on the actions of the first time visitors.

DETAILED DESCRIPTION

Figure 1:
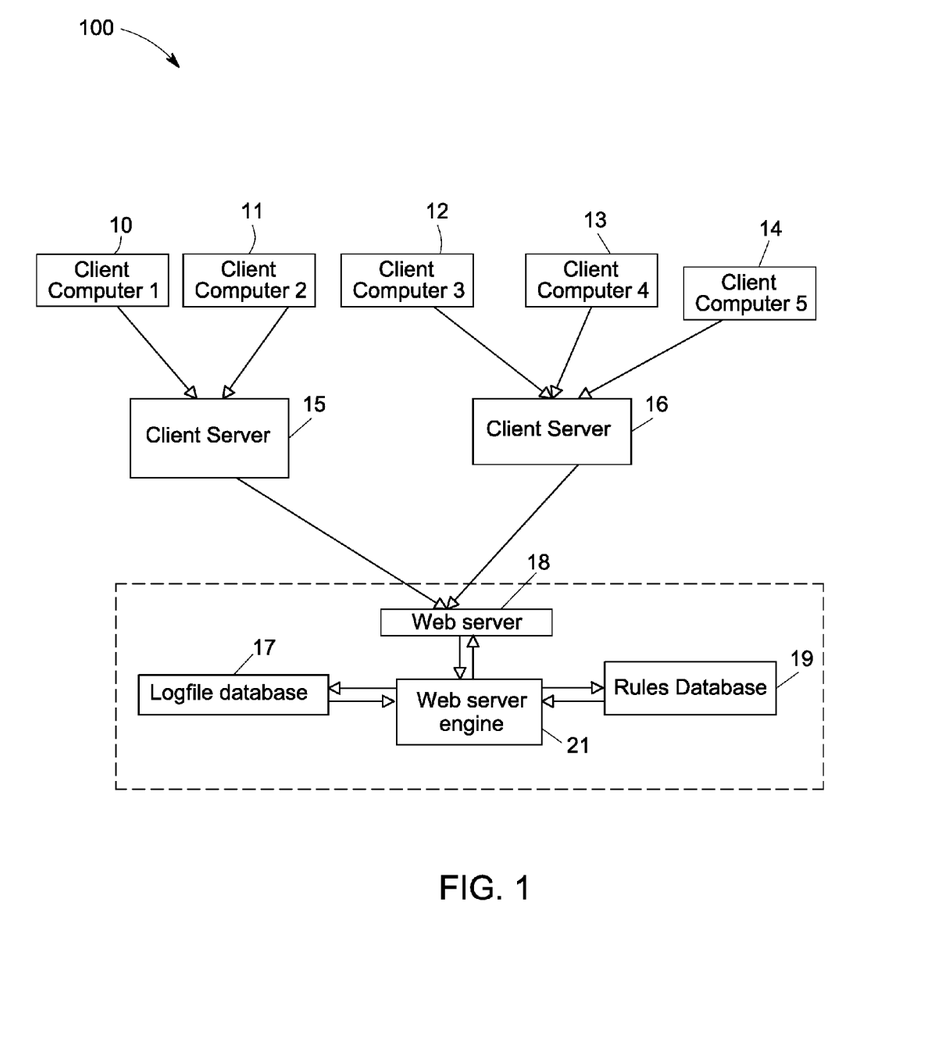
FIG. 1 is a system for online monitoring and recommendation of content to first time visitors in accordance with one embodiment of the invention.

FIG. 1 is a system 100 for online monitoring and recommendation of content to first time visitors of a website in accordance with one embodiment of the invention. In the disclosed embodiment, the system 100 includes client computer systems 10, 11, 12, 13, 14 in communication with client servers 15, 16 for instruction and/or data transfer. In the disclosed embodiment, the client computer systems 10 and 11 are in a communication with client server 15 and, client computer systems 12, 13 and 14 are in a communication with client server 16. In one embodiment, the client computer systems 10, 11, 12, 13, 14 are connected to the client servers 15, 16 by different types of networks such as, for example, intranet, internet or other network known to a person skilled in the art.

The client computer systems 10, 11, 12, 13, 14 are enabled to send web page request to client servers 15, 16 and thus, have the required application software and browsers such as internet explorer and others as known to a person skilled in the art. In operation according to one illustrative example, when the client computer systems 10, 11, 12, 13, 14 send a request for web content to the corresponding client servers 15, 16, the client servers 15, 16, forward the request to a web server 18. In one embodiment, the web server 18 is connected to the client servers 15, 16 by different types of networks such as, for example, intranet, internet or any other network known to a person skilled in the art. The network connecting the client servers 15, 16 with the web server 18, for example, include wired or wireless network.

In the disclosed embodiment, the web server 18 is in a data communication with a web server engine 21. The web server 18 runs one or more web server applications along with other application programs that run simultaneously on the web server 18. In one embodiment, the web server 18 is responsible for various actions including providing the web content or webpage, determination of first time visitors, monitoring actions of the first time visitors or loyal users, recommendation of content to the first time visitors, updation of database including the logfile database 17 and rules database 19 and creation of new rules for the rules database 19, further details of which have been illustrated with reference to FIGS. 2 to 4.

In one embodiment, when the web server 18 receives a web query or a website page request from the client servers 15, 16, the web server 18 forwards query to the web server engine 21. In one embodiment, the web server engine 21 is in a data communication with a log file database 17 and rules database 19. In accordance with one embodiment of the invention, the web server engine 21 is responsible for processing requests received from the web server 18 such as, for example, including providing the web content or website page, determination of first time visitors, monitoring actions of the first time visitors or loyal users, recommendation of content to the first time visitors, updation of database including the logfile database 17 and rules database 19 and creation of new rules for the rules database 19, such as illustrated with reference to FIGS. 2 to 4. In one embodiment, the logfile database 17 stores details of users visiting the website, wherein the details also include features and characteristics of the users. In one embodiment of the invention, the rules database 19 stores rules created by the web server engine 21 for recommending website content to first time visitors.

When the web server 18 receives the web content or website page request from the client servers 15, 16, the web server 18 requests the web server engine 21 for the web content or the website page required by the client servers 15, 16. In accordance with the disclosed embodiment, the web server 18 forwards the request to the web server engine 21. After receiving the request, the web server engine 21 accesses the logfile database 17 to determine if the user is a first time visitor or a loyal user. Determination of first time visitors is illustrated in detail with reference to FIGS. 2 and 3. If the user is a first time visitor, the web server engine 21 extracts features and characteristics of the first time visitor and creates a new log entry in the log file database 17 using certain first time visitor characteristics. In one embodiment and as illustrated in detail with reference to FIGS. 2 and 3, the web server engine 21 recommends web content to the first time visitors by extracting rules from the rules database 19. In still another embodiment and as illustrated in detail with reference to FIGS. 2 and 3, the web server engine 21 monitors actions of the first time visitor to update the logfile database 17 and the rules database 19.

If the user is not a first time visitor and is a return visitor or user, then the web server engine 21 updates the logfile database 17 with the recent web content details required by the user. The web server engine 21 also monitors the return visitor actions and creates new rules on the basis of the user's actions on the website in his first visit and following visits. The monitoring of return visitor's actions and updation of rules are illustrated in detail with reference to FIGS. 2 to 4.

Figure 2:
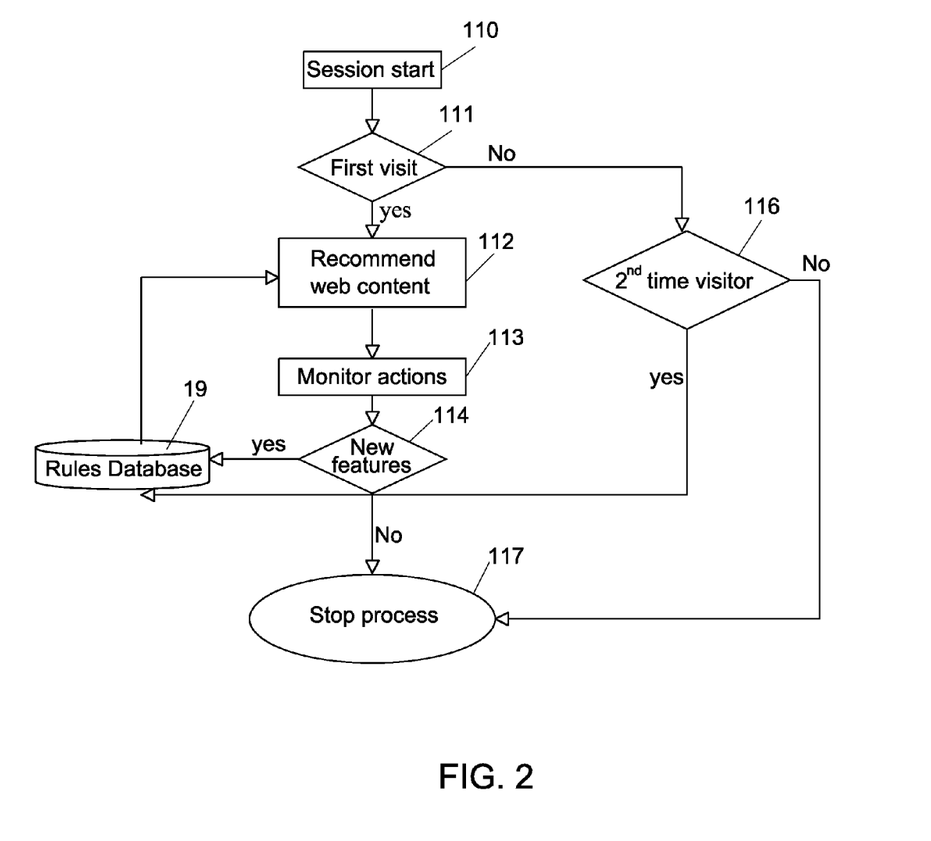
FIG. 2 is a flow chart illustrating online monitoring of first time visitors and recommendations made to the first time visitor in accordance with one embodiment of the invention.

FIG. 2 is a flow chart illustrating online monitoring of first time visitors and recommendations made to the first time visitor in accordance with one embodiment of the invention. Referring to FIGS. 1 and 2, the session commences in step 110, wherein a webserver engine 21 continues to monitor the initiation of a user session on a website. When a user session is initiated, the web server engine 21 determines if the user is a first time visitor in step 111. In one embodiment, the first time visitor can be identified by comparing data embedded in the web content request made by the user to the logfile database 17 hosting the user session information. For example, for a website that requires a login, the login information can be compared against the logfile database 17 hosting such user session information.

The development of the rules database 19 is illustrated in further detail with reference to FIGS. 3 and 4. In one embodiment, a user can be declared a first time visitor if the user has not returned to the website in a predetermined time period or has downloaded data less than a predetermined data size. The time period or data size required for classification as first time visitor may be dependent on business interest and preferences among other factors. If the user is a first time visitor, the online monitoring processing moves to step 112. In step 112, the webserver engine 21 extracts rules from the rules database 19 to recommend and present web content to the first time visitor. In one embodiment, the recommendations are made by using the rules having higher ranking in the rules database 19. In another embodiment, the recommendations are made by analyzing the characteristics of the first time visitor utilizing the web content request data and recommending rules pertinent to the characteristics of the first time visitor. In step 113 after recommending the web content to the first time visitor, the webserver engine 21 monitors and stores the actions of the first time visitor. In one embodiment, the monitoring of actions of the first time visitor include information such as, for example, acceptance of the recommendations made by the web server engine 21, rejection of the recommendations, time spent to review the web content recommended and time spent on the website after recommendations. The monitored information is then used to extract characteristics and features of the first time visitor to form or modify the rules. In one embodiment, the features and characteristics include the interest of the first time visitor that is indicated by pages and content of the website visited by the first time visitor. In another embodiment, the features and characteristics include the operating system used by the first time visitor, date of visit, time of visit, client IP address, user name, service name, client server name, client server IP address, server port, protocol status, Win32 status, bytes sent, bytes received, protocol version, host, user agent, cookie, referrer, city of the first time visitor, country of the first time visitor, website pages viewed and operating system. The characteristics and features are then used to determine or modify rules to be applied to the first time visitors. In one embodiment, the extraction of characteristics and formation of rules is done offline. The rules are then compared with the existing rules in the rules database 19 in step 114. If the rules exist in the rules database 19, then the rules are rejected and the process is stopped in step 117, else the rules are stored or updated in the rules database 19.

In accordance with another embodiment, when the user is not a first time visitor in step 111, the web server engine 21 checks if the user is a second time visitor in step 116. If the visitor is a second time visitor, the logfile database 17 is updated about the return of the first time visitor. In one embodiment, the return of the first time visitor may be due to recommendations made to the second time visitor in his first time visit. Thus, the database is analyzed for records of the second time visitor, updating of rules and ratings of the rules. For example, if the application of a particular set of rules resulted in return of n number of first time visitors, then the rating given to the set of rules applied to the n number of first time visitors is more in comparison to other set of rules that led to return of less than n number of first time visitors. In the disclosed embodiment, if the user is neither a first time visitor nor a second time visitor, then the process is stopped at step 117.

Figure 3A:
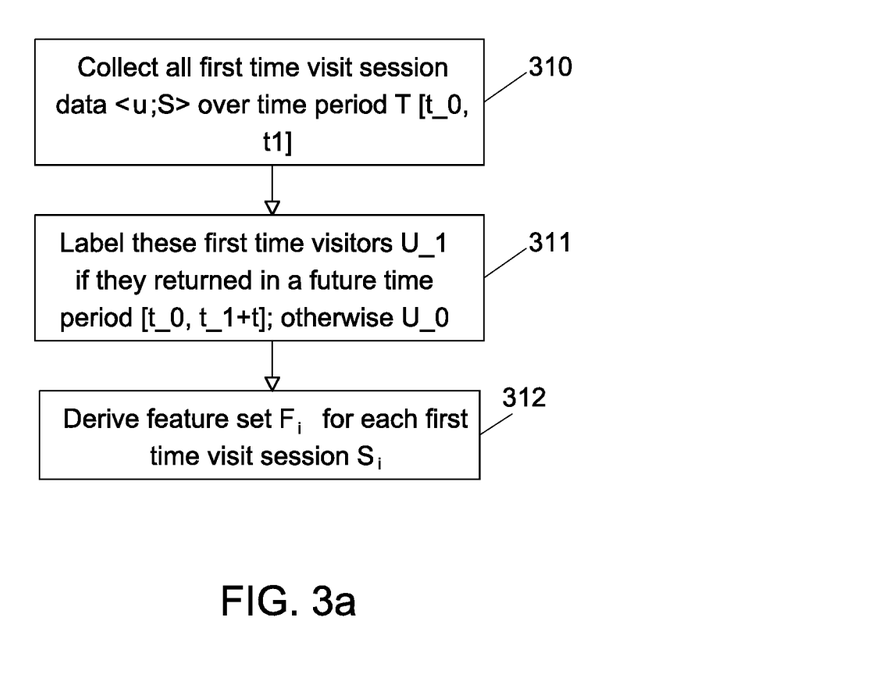
FIG. 3a is a flow chart illustrating tagging of the user as a first time visitor or a return visitor in accordance with one embodiment of the invention.

FIG. 3a is a flow chart illustrating tagging of the user as the first time visitor or a return visitor. Referring to FIGS. 1 and 3a, in step 310 when the user visits the website, the web server engine 21 collects the user's session data (illustrated in detail with reference to FIG. 4) and stores it in the logfile database 17. In one embodiment, the user's session data, for example, includes operating system used by the user, date of website visit, time of website visit, client IP address, user name, service name, server name, server IP address, server port, method, protocol status, Win32 status, bytes sent, bytes received, protocol version, host, user agent, cookie and referrer. The user is then identified in step 311 as the first time visitor or a return visitor. In identification of the user as the first time visitor or the return visitor, the web server engine 21 compares the user data with the logfile database 17 to identify if the user has visited the website in a time period T. In one embodiment, the user is declared to be the first time visitor if no record of the user exists for a previous time period T in the logfile database 17. In step 311 the user's session is tagged as U_0 if the user visited the website for the first time, otherwise the user's session is tagged as U_1. In step 312, all the first time visitors tagged as U_0 are used to determine features and characteristics as described with reference to FIG. 2. The features and characteristics of the first time visitors are then used to determine rules. For example, a rule may include recommending page B to a first time visitor if the first time visitor visited page A using a Macintosh operating system.

Figure 3B:
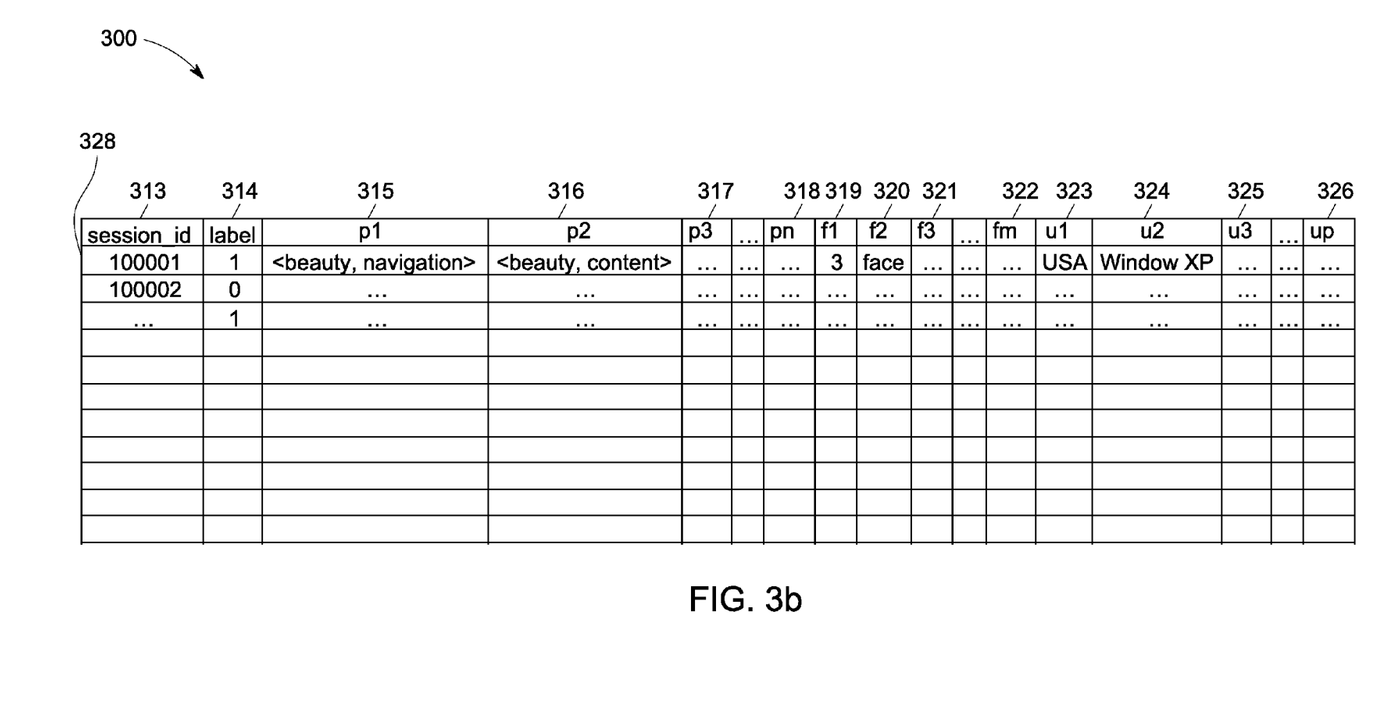
FIG. 3b is an exemplary table used for storing users data in the logfile database in accordance with one embodiment of the invention.

FIG. 3b is an exemplary table 300 used for storing a user's session data in the logfile database 17 in accordance with one embodiment of the invention. In one example, the user's data includes features and characteristics of the users. In one embodiment, the characteristics and features are divided in two subcategories. The two subcategories include features that the website may influence (hereinafter "x features") and features that cannot be influenced or controlled by the website (hereinafter "z features"). For example, an x feature can include part of the website visited by the user and a z feature can include the operating system used by the user. In still another example, the website make recommendations to influence the user to visit a particular part of the website, thus pages visited by the user is an x feature. However, the operating system used by the user cannot be influenced by the website, thus the type of operating system used is a z feature. The type of table used for storage of features and characteristics, for example, include hash table or tables known to a person skilled in the art.

In the disclosed embodiment, in the table 300, the features are divided in three parts including pages viewed by the user in a user session, attributes of the user and derived attributes. The pages viewed by the user in a user session include p1 315 to pn 318. For example, if the user viewed content of pages p1, p2 and p3, then the columns of pages p1, p2 and p3 are filled with the content viewed in those pages. In the disclosed embodiment, in first row 328, the first time visitor visited pages p1 315 and p2 316. Thus, the row 328 and columns p1 315, p2 316 are filled by the content viewed by the user in pages p1 315 and p2 316. In website page p1 315, the first time visitor of row 328 visited beauty at level 1 of the hierarchy and navigation at level 2 of the hierarchy. Similarly, in page 2, the first time visitor of row 328 visited beauty at level 1 and content at level 2. The website pages viewed by the user may be controlled by the website and thus are x features in table 300. In the table 300, the web site pages viewed by the user are stored as hierarchical website pages visited by the first time visitor or the return visitor. The hierarchical website pages are produced by structuring the website as a hierarchical website and mapping the user's session to the hierarchical web structure of the website. Mapping of the user's session to a hierarchical user's session is illustrated in detail with reference to FIG. 5.

The table 300 includes session id 313 of user session that identifies the user uniquely and a tag 314 that identifies the user as the first time visitor or the return visitor. In the disclosed embodiment, when the tag 314 is 0, it identifies the user as a first time visitor and when the tag is 1, it identifies the user as a return visitor. The table also includes z features in columns u1 323 to up 326 that stores information such as operating system, location and city of user. The table 300 also includes derived attributes f1 319 to fp 322 that are derived from the pages viewed in the user session and the z feature u1 to up.

In one embodiment, the rules are derived by using CART (Classification and Regression Trees) and other rule derivation methods such as, for example, frequent items mining. The CART is used to train a classifier and then extract a set of simple and complex rules. The rule derivation methods perform an exhaustive search to assess the discriminant power of single feature, pair features, triple features, and so on and choose desired set of rules. For example, if we use a vector [f1, f2, f3, f4] to represent the attributes of a first time visitor, then single features are f1, f2, f3, and f4 individually; pair features are the distinct subset vectors of size of two such as [f1, f2], [f1, f3], [f1, f4], [f2, f3], [f3, f4]; while the triple features are [f1, f2, f3], [f1, f2, f4], [f1, f3, f4], [f2, f3, f4]. In one embodiment the learning involves assessing the return probability when a first time visitor has such features (single, pair, or triple).

Figure 4:
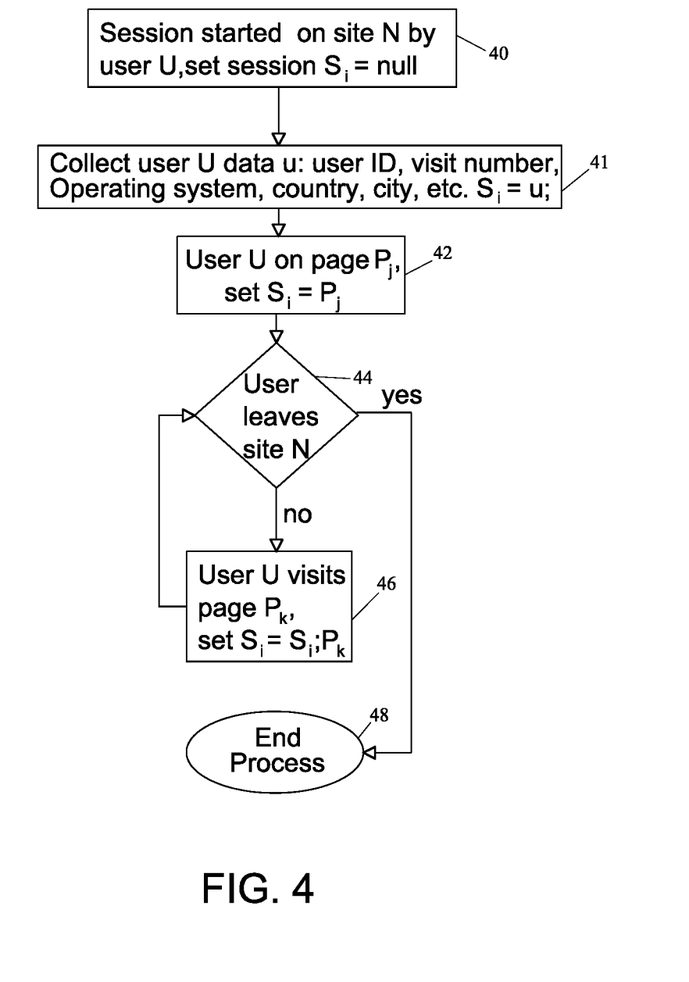
FIG. 4 is a flow chart for collection of user session data according to an embodiment of the invention.

FIG. 4 is a flow chart for the collection of a user's session data according to an embodiment of the invention. In the disclosed embodiment, a website includes hierarchical distribution of content of the website such that each content on a page of the website is categorized in at least two levels of hierarchy. Thus, the website has a finite number of levels with mapping from each website page into the level hierarchy. In the website, each website page is numbered and has a granular level in the hierarchical structure. A user session and a hierarchical user session respectively can be represented as:

$S=<P1, P2>$ or $S=P1; P2$ where P1, P2 are pages, and
$HS =<level_{1,1}, level_{2,1}>; <level_{1,2}, level_{2,2}>$
where P1 is mapped to $<level_{1,1}, level_{2,1}>$ and P2 is mapped to $<level_{1,2}, level_{2,2}>$ Referring now to step 40 of FIG. 4, a new session $S_i$ of a user U on a website is initialized as null where i is the number of session. For example, when a first session is started on the website N, the value of i is 1 thus $S_1$=null. The website session is kept null until the user U visits a website page, thus the null session signifies no website page visit by the user U on the website N. When the user initiates a session on the website, the web server in step 41 assigns the user a user id and stores other information about the user including visit number, operating system, country and city.

In step 42 session $S_i$ is equalized to the first page visited by the user in the user session and is represented as $S_i=P_j$. For example, in a first session the user visits $P_2$ as the first page then $S_1$ is equalized to $P_2$. In step 44 the continuity of the user session is checked. Thus, if the user left the website after viewing one page the user session is declared as ended in step 48, otherwise it is moved to step 46. In step 46, the user session $S_i$ is set to $S_i=S_i; P_k$ where k is the number of page visited by the user, and $P_k$ is the last website page visited by the user. In one aspect, a user session of the user U is represented as follows:

$S_1=<P_1, P_4, P_5, P_6>$

In step 46, the process of appending the pages in the user session continues until the user session is ended. In one illustrative example, if there are five sessions than the sessions are represented as follows:

$S_1=<P_1, P_2>, S2=<P_2, P_5>, S_3=<P_4, P_8, P_9>, S4=<P_5, P_6, P_9>, S_5=<P_3, P_4, P_7>$

Figure 5:
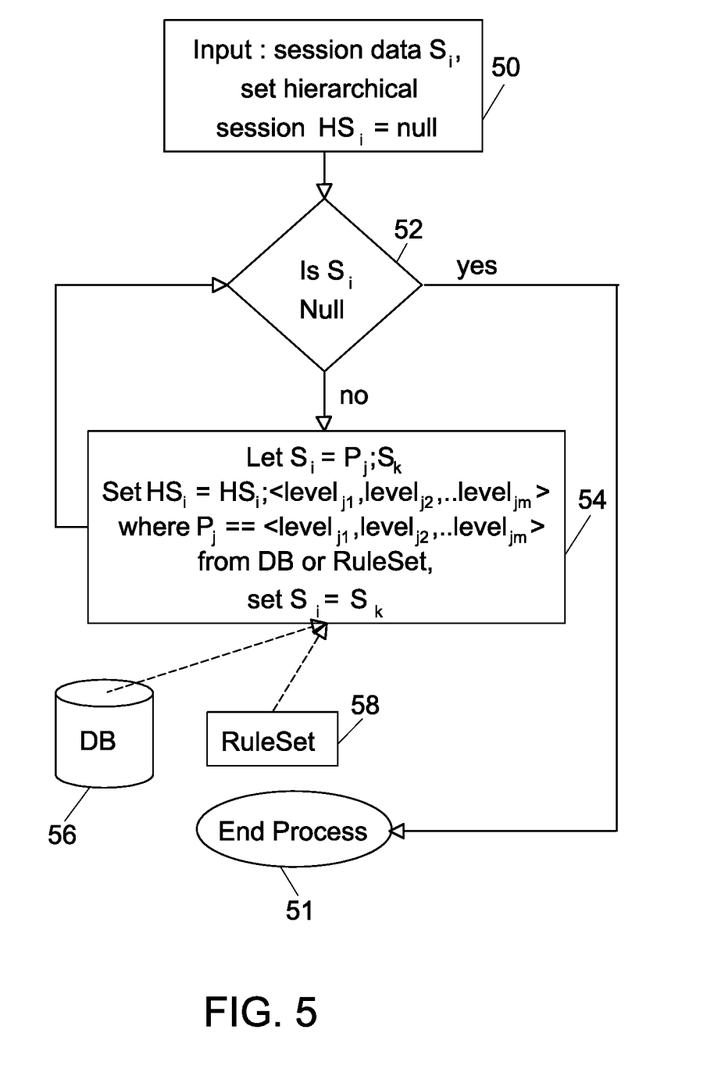
FIG. 5 is a flow chart for mapping the user session to hierarchical session in accordance with one embodiment of the invention.

FIG. 5 is a flow chart for mapping the user session to hierarchical session. A hierarchical user session is a session mapped to the hierarchical levels of the website.

$HS=<level_1, level_2, level_3 \ldots level_j>; <level_1, level_2, level_3 \ldots >$ In step 50 the user sessions collected in FIG. 4 are taken as an input. For a user session $S_i$, the hierarchical session $HS_i$ is initialized as null. In step 52 it is determined whether $S_i$ is null or has some pages visited by a user in session $S_i$. When the user session $S_i$ is null, the process is ended, as there are no more website page views by the user. When the user session $S_i$ is not null and has some website page views by the user, the process proceeds to step 54. In step 54 website usage data about the user session $S_i$ is received from the database 56 and rules 58 from the rule set is applied to map sessions $S_i$ to a hierarchical user session $HS_i$. In order to map user sessions $S_i$ to a hierarchical session $HS_i$, $S_i$ and $HS_i$ are represented as follow:

$S_i = P_j; S_k$ $HS_i = HS_i; <level_{j1}, level_{j2}, level_{j3} \ldots level_{jm}>$ where $P_j$ is a page, j is a number of a page and $S_k$ is remaining user session of user session $S_i$ after extracting website page $P_j$ and $P_j = <level_{j1}, level_{j2}, level_{j3} \ldots level_{jm}>$ is the mapping of $P_j$ to the hierarchical levels using the ruleset and database. Once $P_j$ is mapped to hierarchical structure of the website, step 52 is repeated to determine the presence of other website page view in the session $S_i$. Thus, step 54 is repeated till $S_i$ is null and there are no more website page views by the user. For example, for a website with two levels of hierarchy including $level_1$ and $level_2$, $level_1$ has categories including Beauty and Health, and $level_2$ has categories including Navigation and Content. Each user session is a sequence of website page views and a website page view may be represented as $<level_1, level_2>$. Thus, when user sessions $S_1$, $S_2$ and $S_3$ are mapped to the hierarchical structure of the website, the hierarchical user sessions $HS_1$ $HS_2$ and $HS_3$ are represented as follow:

$HS_1 = <Beauty, Navigation>; <Beauty, Content>$ $HS_2 = <Beauty, Navigation>; <Beauty, Navigation>$ $HS_3 = <Beauty, Navigation>; <Health, Content>$ While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer hardware implemented method of website mining, comprising:
   collecting user session data of users visiting the website and identifying first time visitors;
   determining features of the first time visitors utilizing the user session data;
   determining rules utilizing the features of the first time visitors;
   providing recommendations of web content comprising a webpage by applying the rules;
   monitoring actions of the first time visitors on the website, wherein the monitoring of actions of the first time visitors include acceptance of the recommendations, rejection of the recommendations, time spent to review recommended data, time spent on the website after recommendations, or a combination thereof; and
   updating the rules utilizing the monitored actions of the first time visitors.

2. The method of claim 1 wherein the first time visitors are tagged for identification of the first time visitors.

3. The method of claim 1, wherein identifying the first time visitors comprises identifying users that have not visited the website for a predefined time period, has downloaded data less than a predetermined size from the website, or both.

4. The method of claim 1, wherein the features of the first time visitors include date of visit, time of visit, client IP address, user name, service name, client server name, client server IP address, server port, method, protocol status, Win32 status, bytes sent, bytes received, protocol version, host, user agent, cookie, referrer, website pages viewed, operating system, city of the first time visitor, country of the first time visitor and session id.

5. The method of claim 1, wherein the features of the first time visitors are stored in a hash table.

6. The method of claim 1, wherein the features of the first time visitor are stored in a logfile database.

7. The method of claim 1, wherein the rules of the first time visitors are derived using Classification and Regression Trees.

8. The method of claim 1, wherein the determination and updating the rules is done offline.

9. The method of claim 1, comprising: recommending the web content on the basis of the rules corresponding to the features of the first time visitor.

10. The method of claim 1, wherein the recommendation of web content to the first time visitor is done online.

11. The method of claim 1, wherein the recommendations are made utilizing highly ranked rules in the rules database.

12. The method of claim 1, wherein the rules determined have a ranking of preference.

13. The method of claim 1, wherein updating the rules include updating rankings of the existing rules based upon the actions.

14. The method of claim 1, wherein updating the rules include comparing a determined rule with an existing rule.

15. The method of claim 14 wherein the determined rule is stored in the database if the determined rule does not exist in the existing rules.

16. The method of claim 1, wherein the monitoring of actions of the first time visitors comprises at least two of acceptance of the recommendations, rejection of the recommendations, time spent to review recommended data, and time spent on the website after recommendations.

17. The method of claim 1, comprising:
   retaining the recommendations for subsequent first time visitors when the first time visitors accept the recommendations; and
   discarding the recommendations for the subsequent first time visitors when the first time visitors reject the recommendations.

18. A system of website mining comprising:
   a webserver for storing web usage data of a website in a non-transitory storage device; and
   a webserver engine connected to the webserver for:
      processing the user session data to determine features of first time visitors of the website and determining rules based on the features of the first time users;
      providing recommendations of web content comprising a webpage by applying the rules;
      monitoring actions of the first time visitor to update the rules, wherein the monitoring of actions of the first time visitors include acceptance of the recommendations, rejection of the recommendations, time spent to review recommended data, time spent on the website after recommendations, or a combination thereof; and
      updating the rules based on the actions of the first time visitors.

19. The system of claim 18 wherein the website has a finite number of hierarchical levels with mapping from each website page into the hierarchical levels, and
   wherein each user session is mapped to the hierarchical levels of the website.

20. A computer hardware implemented method of website mining, comprising:
- collecting user session data of users visiting the website and identifying first time visitors;
- determining features of the first time visitors utilizing the user session data;
- determining ranked rules utilizing the features of the first time visitors;
- monitoring actions of the first time visitors on the website, wherein the monitoring of actions of the first time visitors comprises acceptance of the recommendations, rejection of the recommendations, time spent to review recommended data, and time spent on the website after recommendations; and
- updating the ranked rules utilizing the monitored actions of the first time visitors.

* * * * *